US008337373B2

(12) United States Patent
Sakata

(10) Patent No.: US 8,337,373 B2
(45) Date of Patent: Dec. 25, 2012

(54) CONDUCTIVE ELASTIC ROLLER AND IMAGE FORMING APPARATUS COMPRISING THE SAME

(75) Inventor: Junji Sakata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 864 days.

(21) Appl. No.: 12/444,259

(22) PCT Filed: Sep. 28, 2007

(86) PCT No.: PCT/JP2007/069057

§ 371 (c)(1),
(2), (4) Date: Apr. 3, 2009

(87) PCT Pub. No.: WO2008/044502

PCT Pub. Date: Apr. 17, 2008

(65) Prior Publication Data

US 2010/0014891 A1 Jan. 21, 2010

(30) Foreign Application Priority Data

Oct. 5, 2006 (JP) ................................ 2006-274051
Nov. 15, 2006 (JP) ................................ 2006-309281

(51) Int. Cl.
*F16C 13/00* (2006.01)
*B21K 1/02* (2006.01)

(52) U.S. Cl. .............................. 492/56; 492/53; 492/59

(58) Field of Classification Search .................... 492/56, 492/53, 59, 48
See application file for complete search history.

(56) References Cited

U.S. PATENT DOCUMENTS 5,302,627 A * 4/1994 Field et al. ..................... 522/13
(Continued)

FOREIGN PATENT DOCUMENTS

EP 2073068 A1 * 6/2009
(Continued)

OTHER PUBLICATIONS

EP Communication for EP Application No. 07828798.4 dated Apr. 20, 2012, accompanied by the Supplementary European Search Report dated Apr. 13, 2012.

*Primary Examiner* — Essama Omgba
(74) *Attorney, Agent, or Firm* — Sughrue Mion, PLLC

(57) ABSTRACT

There is provided a conductive elastic roller (1) comprising a shaft member (2) and one or more elastic layers (3) disposed on an outside of the shaft member (2) in a radial direction, wherein at least one of the elastic layers (3) is composed of an ultraviolet-curing type resin formed by curing a raw material for the elastic layer comprising a urethane acrylate oligomer (A), a photo-polymerization initiator (B) and a conductive agent (C) through ultraviolet irradiation, and the urethane acrylate oligomer (A) is a urethane acrylate oligomer synthesized by using as a polyol a polyether polyol (a1) having a proportion of primary hydroxyl groups in hydroxyl groups located at molecular ends of not less than 40% obtained by an addition polymerization of propylene oxide to a polyhydric alcohol alone, or the polyether polyol (a1) and another polyol (a2), and provides a conductive elastic roller (1) provided with an elastic layer having a low hardness, a small compression residual strain and an improved stain resistance to an adjoining member such as Organic Photoconductors or the like.

8 Claims, 1 Drawing Sheet

U.S. PATENT DOCUMENTS

| | | | | |
|---|---|---|---|---|
| 6,660,399 | B1 * | 12/2003 | Kitano et al. | 428/500 |
| 2004/0170449 | A1 * | 9/2004 | Sakata et al. | 399/286 |
| 2006/0135709 | A1 * | 6/2006 | Hasegawa et al. | 525/474 |
| 2007/0021563 | A1 * | 1/2007 | Kasai et al. | 525/191 |
| 2007/0177909 | A1 | 8/2007 | Takagi et al. | |
| 2007/0197362 | A1 * | 8/2007 | Sakata et al. | 492/49 |

FOREIGN PATENT DOCUMENTS

| | | | | |
|---|---|---|---|---|
| JP | 9-53024 | A | | 2/1997 |
| JP | 10175368 | A | * | 6/1998 |
| JP | 3004897 | | | 1/2000 |
| JP | 3076032 | B1 | | 8/2000 |
| JP | 2004-150610 | A | | 5/2004 |
| JP | 2004-191638 | A | | 7/2004 |
| JP | 2004354490 | | | 12/2004 |
| JP | 2005-232346 | A | | 9/2005 |
| JP | 2005352015 | | | 12/2005 |
| JP | 2008090227 | A | * | 4/2008 |
| WO | 2005121905 | | | 12/2005 |

* cited by examiner

CONDUCTIVE ELASTIC ROLLER AND IMAGE FORMING APPARATUS COMPRISING THE SAME

TECHNICAL FIELD

This invention relates to a conductive elastic roller and an image forming apparatus comprising such a conductive elastic roller, and more particularly to a conductive elastic roller provided with an elastic layer having a low hardness and an improved stain resistance to an adjoining member such as Organic Photoconductors or the like.

BACKGROUND ART

In general, a roll-shaped conductive elastic member or a conductive elastic roller is frequently used as a developing roller, a charging roller, a toner feed roller, a transfer roller, a paper feed roller, a cleaning roller, a pressure roller for fixing or the like in an image forming apparatus of an electrophotographic system such as a copying machine, a facsimile, a laser beam printer (LBP) or the like. Typically, the conductive elastic roller comprises a shaft member journaled at both longitudinal end portions thereof and at least one elastic layer disposed on an outside of the shaft member in a radial direction.

As the shaft member of the conductive elastic roller are used various resins such as engineering plastics and so on in addition to metals such as iron, stainless and so on. On the other hand, as the elastic layer of the conductive elastic roller are used various thermosetting resins such as thermosetting urethane resin and so on. The roller is produced by charging a resin material into a mold having a desired cavity form and curing the resin material under heating (see JP-A-2004-150610).

DISCLOSURE OF THE INVENTION

However, when the thermosetting urethane resin or the like is used in the elastic layer to produce the conductive elastic roller, it is necessary to cure the resin material under heating, so that a large quantity of heat energy is required and a considerable time is also required in the curing. Further, there is a problem that considerable expense for equipment such as a curing furnace or the like is required for conducting the heat curing.

On the contrary, the inventor has made studies on a conductive elastic roller using an ultraviolet-curing type resin in the elastic layer instead of the thermosetting resin, and found that since the ultraviolet-curing type resin using a common urethane acrylate oligomer is high in the hardness, the resulting elastic layer of the conductive elastic roller tends to become hard and is high in the staining properties to an adjoining member.

When the roller provided with the elastic layer having high staining properties to the adjoining member is used as a developing roller or the like in an image forming apparatus, it stains an adjoining member such as Organic Photoconductors or the like, and hence a bad imaging is easily caused. Therefore, the elastic layer of the conductive elastic roller is required to be sufficiently low in the staining properties to the adjoining member. Further, when the roller provided with the elastic layer having a high hardness is used as a developing roller or the like in the image forming apparatus, toners are aggregated or fused due to damages caused by repeatedly subjecting to compression or friction between rollers, and hence a bad imaging is easily caused. Therefore, the elastic layer of the conductive elastic roller is required to be sufficiently low in the hardness.

On the other hand, when the conductive elastic roller provided with the elastic layer having a low hardness is used in an image forming apparatus, traces due to pressure-contacting with a photosensitive drum, a blade, a feed roller or the like are easily caused on the surface of the roller. In this case, there is a problem that a stripe-shaped bad imaging is easily caused on the resulting image. Therefore, the elastic layer of the conductive elastic roller is also required to have a sufficiently small compression residual strain (C set).

Also, the inventor has made further studies and found that when an electron conductive agent such as carbon black or the like is used in the ultraviolet-curing type resin, the electron conductive agent absorbs ultraviolet light, and it is difficult to conduct the curing through ultraviolet light. On the other hand, when a common ion conductive agent is used in the ultraviolet-curing type resin, a liquid ion conductive agent is added or dissolved in a usual diluent and added for dispersing the ion conductive agent into the ultraviolet-curing type resin. At this moment, it has been found that when a non-reactive polyether polyol or the like is used as a diluent for the ion conductive agent, if the roller provided with the elastic layer made from the ultraviolet-curing type resin using the common ion conductive agent is used as a developing roller or the like in an image forming apparatus, the adjoining member such as Organic Photoconductors or the like is stained due to the bleeding of the diluent, and hence a bad imaging is easily caused. From this viewpoint, therefore, the elastic layer of the conductive elastic roller is required to be sufficiently low in the staining properties to the adjoining member.

Furthermore, it has been found that when an ultraviolet-curable acrylate monomer having a large number of acryloyloxy groups ($CH_2$=CHCOO—) such as pentaerythritol triacrylate or the like is used as the diluent for the ion conductive agent, the elastic layer of the conductive elastic roller tends to become hard, and when the roller is used as a developing roller or the like in an image forming apparatus, toners are aggregated or fused due to damages caused by repeatedly subjecting to compression or friction between rollers, and hence a bad imaging is easily caused. Therefore, from this viewpoint, the elastic layer of the conductive elastic roller is required to be sufficiently low in the hardness.

It is, therefore, an object of the invention to provide a conductive elastic roller provided with an elastic layer having a low hardness and an improved stain resistance to an adjoining member such as Organic Photoconductors or the like and capable of producing in a short time without requiring a large quantity of heat energy and considerable expense for equipment, or further a conductive elastic roller provided with an elastic layer having a small compression residual strain. Also, it is another object of the invention to provide an image forming apparatus using such a conductive elastic roller and capable of stably forming a good image.

The inventor has made various studies in order to achieve the above objects and discovered that a conductive elastic roller provided with an elastic layer having a low hardness, a small compression residual strain and an improved stain resistance to an adjoining member such as Organic Photoconductors or the like and capable of producing in a short time without requiring a large quantity of heat energy and considerable expense for equipment can be obtained by curing a raw material composition comprising a urethane acrylate oligomer synthesized by using specific starting materials, a photopolymerization initiator and a conductive agent through ultraviolet irradiation to form the elastic layer, and as a result the invention has been accomplished.

Also, the inventor has made further studies and discovered that a conductive elastic roller provided with an elastic layer having a low hardness and an improved stain resistance to an adjoining member such as Organic Photoconductors or the like and capable of producing in a short time without requiring a large quantity of heat energy and considerable expense for equipment can be obtained by curing a raw material composition comprising a urethane acrylate oligomer, a photo-polymerization initiator and an ion conductive agent diluted with a diluent composed of a specific ultraviolet-curable acrylate monomer through ultraviolet irradiation to form the elastic layer, and as a result the invention has been accomplished.

That is, the first conductive elastic roller according to the invention comprises a shaft member and one or more elastic layers disposed on an outside of the shaft member in a radial direction, and is characterized in that at least one of the elastic layers is composed of an ultraviolet-curing type resin formed by curing a raw material for the elastic layer comprising a urethane acrylate oligomer (A), a photo-polymerization initiator (B) and a conductive agent (C) through ultraviolet irradiation, and the urethane acrylate oligomer (A) is a urethane acrylate oligomer synthesized by using as a polyol a polyether polyol (a1) having a proportion of primary hydroxyl groups in hydroxyl groups located at molecular ends of not less than 40% obtained by an addition polymerization of propylene oxide (PO) to a polyhydric alcohol alone, or the polyether polyol (a1) and another polyol (a2).

The second conductive elastic roller according to the invention comprises a shaft member and one or more elastic layers disposed on an outside of the shaft member in a radical direction, and is characterized in that at least one of the elastic layers is composed of an ultraviolet-curing type resin formed by curing a raw material for the elastic layer comprising a urethane acrylate oligomer (A), a photo-polymerization initiator (B) and an ion conductive agent (E) diluted with a diluent (D) through ultraviolet irradiation, and the diluent (D) for the ion conductive agent (E) is an ultraviolet-curable acrylate monomer (F) having a functionality of 1-2 and a molecular weight of 100-1000.

Also, the method of producing the second conductive elastic roller according to the invention is preferable to comprise the steps of:

diluting an ion conductive agent (E) with a diluent (D) which is an ultraviolet-curable acrylate monomer (F) having a functionality of 1-2 and a molecular weight of 100-1000, mixing the ion conductive agent (E) diluted with the diluent (D), a urethane acrylate oligomer (A) and a photo-polymerization initiator (B) to prepare a raw material for an elastic layer, applying the raw material for the elastic layer onto an outer periphery of a shaft member, and curing the raw material for the elastic layer through ultraviolet irradiation to form an ultraviolet-curing type resin.

In the first conductive elastic roller according to the invention, the polyether polyol (a1) is preferable to have a molecular weight of 500-5,000, a functionality of 1.5-2.5 and a hydroxyl value of 20-230 mg KOH/g.

In a preferable embodiment of the first conductive elastic roller according to the invention, a mass ratio (a1/a2) of the polyether polyol (a1) to the other polyol (a2) is within a range of 100/0-30/70.

In a preferable embodiment of the second conductive elastic roller according to the invention, the ion conductive agent (E) is a lithium salt (G).

In the second conductive elastic roller according to the invention, a mass ratio (E/F) of the ion conductive agent (E) to the acrylate monomer (F) is preferable to be within a range of 60/40-1/99.

In the second conductive elastic roller according to the invention, isomyristyl acrylate, methoxytriethylene glycol acrylate, lauryl acrylate, tripropylene glycol diacrylate and polyethylene glycol diacrylate are preferable as the acrylate monomer (F).

In a preferable embodiment of the conductive elastic roller according to the invention, the raw material for the elastic layer further contains an acrylate monomer (H). As the acrylate monomer (H) are preferable isomyristyl acrylate and β-acryloyloxyethyl hydrogen succinate.

In the conductive elastic roller according to the invention, the ultraviolet-curing type resin is preferable to have an Asker C hardness of 40-60 degrees.

The conductive elastic roller according to the invention is preferable as a developing roller or a charging roller.

Also, the image forming apparatus according to the invention is characterized by using the above-described conductive elastic roller.

According to the invention, there can be provided a conductive elastic roller provided with an elastic layer(s) having a low hardness, a small compression residual strain and an improved stain resistance to an adjoining member such as Organic Photoconductors or the like and capable of producing in a short time without requiring a large quantity of heat energy and considerable expense for equipment by curing a raw material for the elastic layer comprising a urethane acrylate oligomer (A) synthesized by using a polyether polyol (a1) having a proportion of primary hydroxyl groups in hydroxyl groups located at molecular ends of not less than 40%, a photo-polymerization initiator (B) and a conductive agent (C) through ultraviolet irradiation to form at least one of the elastic layers. Furthermore, there can be provided a conductive elastic roller provided with an elastic layer(s) having a low hardness and an improved stain resistance to an adjoining member such as Organic Photoconductors or the like and capable of producing in a short time without requiring a large quantity of heat energy and considerable expense for equipment by curing a raw material for the elastic layer comprising a urethane acrylate oligomer (A), a photo-polymerization initiator (B) and an ion conductive agent (E) diluted with a diluent (D) composed of an ultraviolet-curable acrylate monomer (F) having a functionality of 1-2 and a molecular weight of 100-1000 through ultraviolet irradiation to form at least one of the elastic layers. Moreover, there can be provided an image forming apparatus comprising such a conductive elastic roller and capable of stably forming a good image.

BEST MODE FOR CARRYING OUT THE INVENTION

Conductive Elastic Roller

Figure 1:
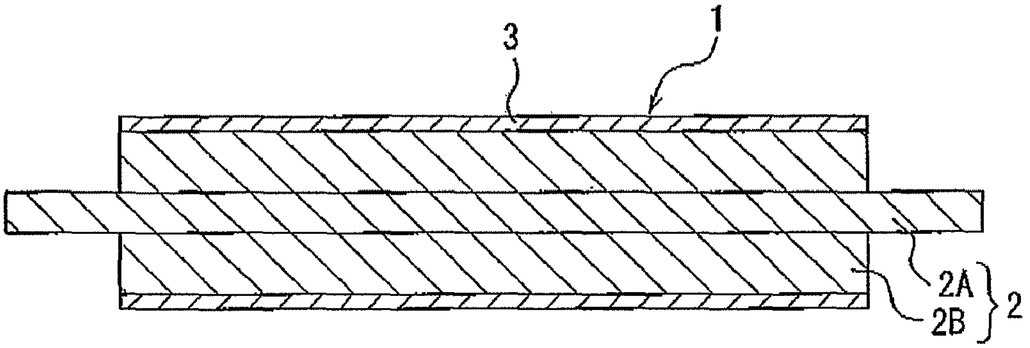
FIG. 1 is a sectional view of an embodiment of the conductive elastic roller according to the invention.

The conductive elastic roller according to the invention will be described in detail below with reference to FIG. 1. FIG. 1 is a sectional view of an embodiment of the conductive elastic roller according to the invention. The illustrated conductive elastic roller 1 comprises a shaft member 2 journaled at both longitudinal end portions thereof and an elastic layer 3 disposed on an outside of the shaft member 2 in a radial direction. Although the conductive elastic roller 1 shown in FIG. 1 comprises only one elastic layer 3, the conductive elastic roller according to the invention may comprise two or more elastic layers. Also, the conductive elastic roller according to the invention may comprise a coating layer on the outside of the elastic layer 3 in the radial direction though it is not shown.

In FIG. 1, the shaft member 2 is comprised of a metal shaft 2A and a high-stiffness resin substrate 2B disposed on the outside of the metal shaft 2A in the radial direction. However, the shaft member in the conductive elastic roller according to the invention is not particularly limited as far as it has a good electrical conductivity, and may be composed of only the metal shaft 2A or only the high-stiffness resin substrate, or may be a hollow cylindrical body made of the metal or high-stiffness resin or the like. When the high-stiffness resin is used in the shaft member 2, it is preferable that a conductive agent is added and dispersed into the high-stiffness resin to sufficiently ensure an electrical conductivity. As the conductive agent to be dispersed into the high-stiffness resin are preferable carbon black powder, graphite powder, carbon fiber, metal powder of aluminum, copper, nickel or the like, powder of a metal oxide such as tin oxide, titanium oxide, zinc oxide or the like, and a powdery conductive agent such as conductive glass powder or the like. These conductive agents may be used alone or in a combination of two or more. The amount of the conductive agent compounded is not particularly limited, but is preferable to be within a range of 5-40% by mass, more preferably 5-20% by mass per the whole of the high-stiffness resin.

As a material of the metal shaft 2A or the metal cylindrical body are mentioned iron, stainless steel, aluminum and so on. Also, as a material of the high-stiffness resin substrate 2B are mentioned polyacetal, polyamide 6, polyamide 6.6, polyamide 12, polyamide 4.6, polyamide 6.10, polyamide 6.12, polyamide 11, polyamide MXD6, polybutylene terephthalate, polyphenylene oxide, polyphenylene sulfide, polyether sulfone, polycarbonate, polyimide, polyamide imide, polyether imide, polysulfone, polyether ether ketone, polyethylene terephthalate, polyarylate, liquid crystal polymer, polytetrafluoroethylene, polypropylene, ABS resin, polystyrene, polyethylene, melamine resin, phenolic resin, silicone resin and so on. Among them, polyacetal, polyamide 6.6, polyamide MXD6, polyamide 6.12, polybutylene terephthalate, polyphenylene ether, polyphenylene sulfide and polycarbonate are preferable. These high-stiffness resins may be used alone or in a combination of two or more.

When the shaft member is a metal shaft or a shaft formed by disposing a high-stiffness resin substrate on the outside of such a metal shaft, the outer diameter of the metal shaft is preferable to be within a range of 4.0-8.0 mm. Also, when the shaft member is the shaft formed by disposing the high-stiffness resin substrate on the outside of the metal shaft, the outer diameter of the resin substrate is preferable to be within a range of 10-25 mm. Moreover, the mass increase of the shaft member can be suppressed by using the high-stiffness resin in the shaft member even if the outer diameter of the shaft member becomes large.

In the first conductive elastic roller according to the invention, at least one of the elastic layers is composed of an ultraviolet-curing type resin formed by curing a raw material for the elastic layer comprising a urethane acrylate oligomer (A), a photo-polymerization initiator (B) and a conductive agent (C) through ultraviolet irradiation. In the second conductive elastic roller according to the invention, at least one of the elastic layers is composed of an ultraviolet-curing type resin formed by curing a raw material for the elastic layer comprising a urethane acrylate oligomer (A), a photo-polymerization initiator (B) and a conductive agent (E) diluted with a diluent (D) through ultraviolet irradiation. Moreover, the raw material for the elastic layer may be compounded with various additives without obstructing the object of the invention.

In the first conductive elastic roller according to the invention, the urethane acrylate oligomer (A) used in the raw material for the elastic layer is synthesized by using as a polyol a polyether polyol (a1) having a proportion of primary hydroxyl groups in hydroxyl groups located at molecular ends of not less than 40% obtained by an addition polymerization of propylene oxide (PO) to a polyhydric alcohol alone, or the polyether polyol (a1) and another polyol (a2), which is a compound having one or more acryloyloxy groups ($CH_2$═CHCOO—) and plural urethane linkages (—NH-COO—). For example, the urethane acrylate oligomer (A) can be synthesized by adding an acrylate having a hydroxyl group to a urethane prepolymer synthesized from the above-described polyether polyol (a1) alone or a mixture of the polyether polyol (a1) and the other polyol (a2) and a polyisocyanate. Moreover, the polyether polyol (a1) can be synthesized, for example, according to JP-B-3076032 and JP-B-3688667 by adding propylene oxide (PO) to a polyhydric alcohol such as ethylene glycol, diethylene glycol, 1,4-butanediol, 1,6-hexanediol, propylene glycol, glycerin, trimethylolethane, trimethylolpropane or the like in the presence of a catalyst such as cesium hydroxide, a double metal cyanide complex or the like, removing the catalyst and then adding propylene oxide (PO) in the presence of a catalyst such as tris(pentafluorophenyl)borane, triphenylborane or the like.

When a common urethane acrylate oligomer is used to form an elastic layer through ultraviolet irradiation, the compression residual strain of the elastic layer is large and the staining properties of the roller to an adjoining member is high. Surprisingly, when the urethane acrylate oligomer (A) synthesized by using the polyether polyol (a1) is used to form an elastic layer through ultraviolet irradiation, the staining properties of the roller to the adjoining member can be reduced while reducing the compression residual strain. This is considered due to the fact that the curing properties through ultraviolet light of the raw material for the elastic layer comprising the urethane acrylate oligomer (A) synthesized by using the polyether polyol (a1) are higher than the curing properties through ultraviolet light of the raw material for the elastic layer comprising the common urethane acrylate oligomer. When a urethane acrylate oligomer synthesized without using the polyether polyol (a1) as a polyol is used to form an elastic layer, the staining properties of the roller to the adjoining member cannot be sufficiently reduced but also the compression residual strain of the elastic layer cannot be sufficiently reduced, so that traces due to pressure-contacting with the adjoining member remain in the roller, and the bad imaging is easily caused. From a viewpoint of the compression residual strain of the elastic layer and the staining properties to the adjoining member, the polyether polyol (a1) is preferable to have a proportion of primary hydroxyl groups in hydroxyl groups located at molecular ends of not less than 50%.

In the first conductive elastic roller according to the invention, the polyether polyol (a1) used for the synthesis of the urethane prepolymer is preferable to have a molecular weight of 500-5,000, a functionality of 1.5-2.5 and a hydroxyl value of 20-230 mg KOH/g. The molecular weight used herein means a weight average molecular weight (Mw). When the molecular weight of the polyether polyol (a1) is less than 500, the hardness of the ultraviolet-curing type resin is too high and it is not suitable for the conductive elastic roller, while when it exceeds 5,000, a liquid viscosity becomes too high and it is not suitable for the production.

In the synthesis of the urethane prepolymer, the other polyol (a2) that may be used together with the polyether polyol (a1) is a compound having plural hydroxyl groups (OH groups). As the polyol are concretely mentioned polyether polyol other than the aforementioned polyether polyol (a1), polyester polyol, polybutadiene polyol, alkylene oxide-modified polybutadiene polyol, polyisoprene polyol and so on. Moreover, the polyether polyol can be obtained, for example, by adding an alkylene oxide such as ethylene oxide, propylene oxide or the like to a polyhydric alcohol such as ethylene glycol, propylene glycol, glycerin or the like, while the polyester polyol can be obtained, for example, from a polyhydric alcohol such as ethylene glycol, diethylene glycol, 1,4-butanediol, 1,6-hexanediol, propylene glycol, trimethylolethane, trimethylolpropane or the like and a polyvalent carboxylic acid such as adipic acid, glutaric acid, succinic acid, sebacic acid, pimelic acid, suberic acid or the like. These polyols (a2) may be used alone or in a blend of two or more.

When the other polyol (a2) is used together with the polyether polyol (a1) in the synthesis of the urethane prepolymer, the mass ratio (a1/a2) of the polyether polyol (a1) to the other polyol (a2) is preferable to be within a range of 100/0-30/70. The staining properties of the conductive elastic roller to the adjoining member such as Organic Photoconductors or the like can be sufficiently reduced by rendering a ratio of the polyether polyol (a1) in a total amount (a1+a2) of the polyether polyol (a1) and the other polyol (a2) into not less than 30% by mass (i.e., rendering a ratio of the other polyol (a2) into not more than 70% by mass).

On the other hand, in the second conductive elastic roller according to the invention, the urethane acrylate oligomer (A) used in the raw material for the elastic layer is a compound having one or more acryloyloxy groups ($CH_2$═CHCOO—) and plural urethane linkages (—NHCOO—). The functionality, molecular weight and the like of the urethane acrylate oligomer (A) are not particularly limited. For example, the urethane acrylate oligomer (A) can be produced by synthesizing a urethane prepolymer from a polyol and a polyisocyanate and adding an acrylate having a hydroxyl group to the urethane prepolymer.

In the second conductive elastic roller according to the invention, the polyol used for the synthesis of the urethane prepolymer is a compound having plural hydroxyl groups (OH groups). As the polyol are concretely mentioned polyether polyol, polyester polyol, polytetramethylene glycol, polybutadiene polyol, alkylene oxide-modified polybutadiene polyol, polyisoprene polyol and so on. The polyether polyol is obtained, for example, by adding an alkylene oxide such as ethylene oxide, propylene oxide or the like to a polyhydric alcohol such as ethylene glycol, propylene glycol, glycerin or the like, while the polyester polyol is obtained, for example, from a polyhydric alcohol such as ethylene glycol, diethylene glycol, 1,4-butanediol, 1,6-hexanediol, propylene glycol, trimethylolethane, trimethylolpropane or the like and a polyvalent carboxylic acid such as adipic acid, glutaric acid, succinic acid, sebacic acid, pimelic acid, suberic acid or the like. These polyols may be used alone or in a blend of two or more.

In the conductive elastic roller according to the invention, the polyisocyanate used for the synthesis of the urethane prepolymer is a compound having plural isocyanate groups (NCO groups). As the polyisocyanate are concretely mentioned tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate and hexamethylene diisocyanate (HDI) as well as their isocyanurate-modified compounds, carbodiimide-modified compounds, glycol-modified compounds and so on. These polyisocyanates may be used alone or in a blend of two or more.

In the synthesis of the urethane prepolymer, it is preferable to use a catalyst for urethanation reaction. As the catalyst for urethanation reaction are mentioned organotin compounds such as dibutyltin dilaurate, dibutyltin diacetate, dibutyltin thiocarboxylate, dibutyltin dimaleate, dioctyltin thiocarboxylate, tin octoate, monobutyl tin oxide and the like; inorganotin compounds such as stannous chloride and the like; organolead compounds such as lead octoate and the like; monoamines such as triethylamine, dimethyl cyclohexylamine and the like; diamines such as tetramethyl ethylenediamine, tetramethyl propanediamine, tetramethyl hexanediamine and the like; triamines such as pentamethyl diethylenetriamine, pentamethyl dipropylenetriamine, tetramethylguanidine and the like; cyclic amines such as triethylenediamine, dimethyl piperazine, methyl ethyl piperazine, methyl morpholine, dimethyl aminoethyl morpholine, dimethyl imidazole, pyridine and the like; alcohol amines such as dimethylaminoethanol, dimethylaminoethoxyethanol, trimethylaminoethyl ethanolamine, methyl hydroxyethyl piperazine, hydroxyethyl morpholine and the like; ether amines such as bis(dimethylaminoethyl)ether, ethylene glycol bis (dimethyl) aminopropyl ether and the like; organosulfonic acids such as p-toluene sulfonic acid, methane sulfonic acid, fluorosulfuric acid and the like; inorganic acids such as sulfuric acid, phosphoric acid, perchloric acid and the like; bases such as sodium alcoholate, lithium hydroxide, aluminum alcoholate, sodium hydroxide and the like; titanium compounds such as tetrabutyl titanate, tetraethyl titanate, tetraisopropyl titanate and the like; bismuth compounds; quaternary ammonium salts and so on. Among these catalysts, the organotin compounds are preferable. These catalysts may be used alone or in a combination of two or more. The amount of the catalyst used is preferable to be within a range of 0.001-2.0 parts by mass based on 100 parts by mass of the polyol.

Moreover, the acrylate having a hydroxyl group added to the urethane prepolymer is a compound having one or more hydroxyl groups and one or more acryloyloxy groups ($CH_2$═CHCOO—). The acrylate having the hydroxyl group can be added to the isocyanate group of the urethane prepolymer. As the acrylate having the hydroxyl group are mentioned 2-hydroxyethyl acrylate, 2-hydroxypropyl acrylate, pentaerythritol triacrylate and so on. These acrylates having the hydroxyl group may be used alone or in a combination of two or more.

In the conductive elastic roller according to the invention, the photo-polymerization initiator (B) used in the raw material for the elastic layer has an action of initiating polymerization of the above-mentioned urethane acrylate oligomer (A) or further polymerization of the acrylate monomers (F) and (H) described below through ultraviolet irradiation. As the photo-polymerization initiator (B) are mentioned 4-dimethylaminobenzoic acid, 4-dimethylaminobenzoic acid ester, 2,2-dimethoxy-2-phenylacetophenone, acetophenone diethylketal, alkoxyacetophenone, benzyldimethylketal, benzophenone, benzophenone derivatives such as 3,3-dimethyl-4-methoxy benzophenone, 4,4-dimethoxy benzophenone, 4,4-diamino benzophenone and the like, alkyl benzoylbenzoate, bis(4-dialkylaminophenyl) ketone, benzyl, benzyl derivatives such as benzyl methylketal and the like, benzoin, benzoin derivatives such as benzoin isobutyl ether and the like, benzoin isopropyl ether, 2-hydroxy-2-methyl propiophenone, 1-hydroxycyclohexyl phenylketone, xanthone, thioxanthone, thioxanthone derivatives, fluorene, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)-phenylphosphine oxide, 2-methyl-1-[4-(methylthio)phenyl]-2-morpholinopropane-1,2-benzyl-2-di methylamino-1-(morpholinophenyl)-butanone-1 and so on. These photo-polymerization initiators may be used alone or in a combination of two or more.

In the first conductive elastic roller according to the invention, the conductive agent (C) used in the raw material for the elastic layer has an action of giving an electric conductivity to the elastic layer. As the conductive agent (C) are preferable ones capable of permeating ultraviolet light, and it is preferable to use an ion conductive agent or a transparent electron conductive agent, and the use of the ion conductive agent is particularly preferable. When the ion conductive agent is used as the conductive agent (C), since the ion conductive agent is soluble in the urethane acrylate oligomer (A) and has a transparency, even if the raw material for the elastic layer is thickly applied on the shaft member, ultraviolet light can sufficiently arrive at an inside of the coating layer to sufficiently cure the raw material for the elastic layer. As the ion conductive agent are mentioned perchlorate, chlorate, hydrochloride, bromate, iodate, hydroborofluoride, sulfate, trifluoromethyl sulfate, sulfonate, bis(trifluoromethane sulfonic acid)imide salt and the like of alkali metals such as lithium, sodium, potassium and the like, alkaline earth metals such as calcium, magnesium and the like, and quaternary ammoniums such as tetraethyl ammonium, tetrabutyl ammonium, dodecyltrimethyl ammonium, hexadecyltrimethyl ammonium, benzyltrimethyl ammonium, modified-fatty acid dimethylethyl ammonium and the like. Moreover, as the transparent electron conductive agent are mentioned microparticles of metal oxides such as ITO, tin oxide, titanium oxide, zinc oxide and the like; microparticles of metals such as nickel, copper, silver, germanium and the like; conductive whiskers such as conductive titanium oxide whisker, conductive barium titanate whisker and the like. These conductive agents may be used alone or in a combination of two or more.

In the second conductive elastic roller according to the invention, the ion conductive agent (E) used in the raw material for the elastic layer has an action of giving an electric conductivity to the elastic layer. As the conductive agent (E) are preferable ones capable of permeating ultraviolet light, and the use of a lithium salt (G) is more preferable. When the ion conductive agent (E) is added in the raw material for the elastic layer, it is preliminarily dissolved in a diluent (D) mentioned below and then added.

The lithium salt (G) usable in the raw material for the elastic layer is a type of the ion conductive agent and is small in the environment dependence in the effect of giving the electric conductivity, so that it can reduce an environment dependence in the volume resistivity of the elastic layer. Also, since the lithium salt (G) is soluble in the acrylate monomer (F) mentioned below and has a transparency, even if the raw material for the elastic layer is thickly applied on the shaft member, ultraviolet light can sufficiently arrive at an inside of the coating to sufficiently cure the raw material for the elastic layer. The lithium salt (G) may be a salt of an organic acid such as sulfonic acid, trifluoromethanesulfonic acid or the like, or a salt of an inorganic acid such as perchloric acid, tetrafluoroboric acid or the like. As the lithium salt are mentioned $Li(CF_3SO_2)_2N$, $Li(C_2F_5SO_2)_2N$, $LiClO_4$, $LiBF_4$, $LiPF_6$, $LiCF_3SO_3$, $LiAsF_6$, $LiC_4F_9SO_3$ and so on. Among them, $Li(CF_3SO_2)_2N$ is preferable. These lithium salts (G) may be used alone or in a combination of two or more. The lithium salt (G) may be dissolved in various solvents and mixed with the raw material for the elastic layer.

The diluent (D) used for diluting the ion conductive agent (E) is an ultraviolet-curable acrylate monomer (F) having a functionality of 1-2 and a molecular weight of 100-1000. The diluent (D) used for diluting the ion conductive agent (E) serves as a reactive diluent on the above-mentioned ion conductive agent (E), i.e., it dissolves the ion conductive agent (E) and is cured through ultraviolet light. Thus, when the elastic layer is formed through ultraviolet irradiation by using the acrylate monomer (F) as the diluent of the ion conductive agent (E), the hardness of the resulting elastic layer can be reduced. In addition, since the reactive acrylate monomer (F) is incorporated into a resin skeleton, the bleeding of the diluent is not caused and the staining properties of the roller to the adjoining member can be reduced.

The ultraviolet-curable acrylate monomer (F) is required to have a functionality of 1-2. In this case, the functional group means an acryloyloxy group ($CH_2$═CHCOO—). When the functionality of the acrylate monomer (F) is not less than 1, the unreacted acrylate monomer hardly remains in the elastic layer, while when it is not more than 2, the hardness of the elastic layer can be reduced.

The ultraviolet-curable acrylate monomer (F) is required to have a molecular weight of 100-1000. When the molecular weight of the acrylate monomer (F) is within a range of 100-1000, there can be obtained a low-hardness resin suitable for the elastic layer of the conductive elastic roller.

As the ultraviolet-curable acrylate monomer (F) are mentioned isomyristyl acrylate, methoxytriethylene glycol acrylate, lauryl acrylate, tripropylene glycol diacrylate (for example, "APG-200" manufactured by SHIN-NAKAMURA CHEMICAL CO., LTD.), polyethylene glycol diacrylate (for example, "LIGHT-ACRYLATE 4EG-A" manufactured by Kyoei-Sha Chemical Co., Ltd.) and the like. These acrylate monomers may be used alone or in a combination of two or more.

In the conductive elastic roller according to the invention, the raw material for the elastic layer is preferable to further contain an acrylate monomer (H). The acrylate monomer (H) is a monomer having one or more acryloyloxy groups ($CH_2$═CHCOO—) and serves as a reactive diluent of the raw material for the elastic layer, i.e., it is cured through ultraviolet light and can lower the viscosity of the raw material for the elastic layer. The acrylate monomer (H) is preferable to have a functionality of 1.0-10, more preferably 1.0-3.5. Moreover, the acrylate monomer (H) is preferable to have a molecular weight of 100-2000, more preferably 100-1000.

As the acrylate monomer (H) are mentioned isomyristyl acrylate, methoxytriethylene glycol acrylate, ethyl acrylate, isobutyl acrylate, n-butyl acrylate, isoamyl acrylate, glycidyl acrylate, butoxyethyl acrylate, ethoxydiethylene glycol acrylate, methoxydipropylene glycol acrylate, phenoxyethyl acrylate, 2-hydroxyethyl acrylate, 2-hydroxypropyl acrylate, pentaerythritol triacrylate, p-acryloyloxyethyl hydrogen succinate and so on. Among them, isomyristyl acrylate is preferable in view of reducing an environment dependence of the dimension of the elastic layer, and β-acryloyloxyethyl hydrogen succinate is preferable in view of improving the adhesion property to a coating layer. These acrylate monomers may be used alone or in a combination of two or more.

In the raw material for the elastic layer, the mass ratio (A/H) of the urethane acrylate oligomer (A) to the acrylate monomer (H) is preferable to be within a range of 100/0-10/90. When the ratio of the urethane acrylate oligomer (A) in the total amount of the urethane acrylate oligomer (A) and the acrylate monomer (H) is not less than 10% by mass (i.e., the ratio of the acrylate monomer (H) is not more than 90% by mass), it is possible to provide an elastic layer having a low hardness and a small compression residual strain and being suitable for the conductive elastic roller.

In the raw material for the elastic layer, the mass ratio (E/F) of the ion conductive agent (E) to the acrylate monomer (F) is preferable to be within a range of 60/40-1/99. When the ratio of the ion conductive agent (E) in the total amount of the ion conductive agent (E) and the acrylate monomer (F) is less than 1% by mass (i.e., the ratio of the acrylate monomer (F) exceeds 99% by mass), the electric conductivity of the elastic layer is low and the desired electric conductivity may not be given to the conductive elastic roller. While when the ratio of the ion conductive agent (E) in the total amount of the ion conductive agent (E) and the acrylate monomer (F) exceeds 60% by mass (i.e., the ratio of the acrylate monomer (F) is less than 40% by mass), it cannot be sufficiently diluted (dissolved).

In the raw material for the elastic layer, the amount of the photo-polymerization initiator (B) compounded is preferable to be within a range of 0.2-5.0 parts by mass based on 100 parts by mass in total of the urethane acrylate oligomer (A), the acrylate monomer (F) and the acrylate monomer (H). When the amount of the photo-polymerization initiator (B) compounded is not more than 0.2 part by mass, the effect of initiating the ultraviolet curing of the raw material for the elastic layer is small, while when it exceeds 5.0 parts by mass, the effect of initiating the ultraviolet curing is saturated, and the properties such as compression residual strain and so on are deteriorated and the cost of the raw material for the elastic layer becomes high.

In the raw material for the elastic layer, the amount of the conductive agent (C) or the ion conductive agent (E) compounded is preferable to be within a range of 0.1-5.0 parts by mass based on 100 parts by mass in total of the urethane acrylate oligomer (A), the acrylate monomer (F) and the acrylate monomer (H). When the amount of the conductive agent (C) or the ion conductive agent (E) compounded is less than 0.1 part by mass, the electric conductivity of the elastic layer is low and the desired electric conductivity may not be given to the conductive elastic roller, while when it exceeds 5.0 parts by mass, the electric conductivity of the elastic layer is not increased, and the properties such as compression residual strain and so on are deteriorated and a good image may not be obtained.

Also, a polymerization inhibitor may be further added to the raw material for the elastic layer in an amount of 0.001-0.2 parts by mass based on 100 parts by mass in total of the urethane acrylate oligomer (A), the acrylate monomer (F) and the acrylate monomer (H). By the addition of the polymerization inhibitor can be prevented the thermal polymerization before the irradiation of ultraviolet light. As the polymerization inhibitor are mentioned hydroquinone, methyl hydroquinone, hydroquinone monomethyl ether, p-methoxyphenol, 2,4-dimethyl-6-t-butylphenol, 2,6-di-t-butyl-p-cresol, butyl hydroxy anisole, 3-hydroxythiophenol, α-nitroso-α-naphthol, p-benzoquinone, 2,5-dihydroxy-p-quinone and so on.

The ultraviolet-curing type resin formed by curing the raw material for the elastic layer through ultraviolet irradiation (elastic layer) is preferable to have an Asker C hardness of 30-70 degrees, more preferably 40-60 degrees. The value of the Asker C hardness herein is a value measured on a plane part of a cylindrical sample having a height of 12.7 mm and a diameter of 29 mm. When the Asker C hardness is not less than 30 degrees, a sufficient hardness as the conductive elastic roller such as a developing roller or the like can be ensured, while when it is not more than 70 degrees, the aggregation and fusion of toners having a low melting point can be sufficiently prevented.

The elastic layer is preferable to have a compression residual strain (compression set) of not more than 5%. The compression residual strain can be measured according to JIS K 6262 (2006). Concretely, it can be determined by compressing a cylindrical sample having a height of 12.7 mm and a diameter of 29 mm by 25% in a height direction of the sample under the predetermined heat-treating conditions (at 70° C. for 22 hours). When the compression residual strain of the elastic layer is not more than 5%, if the conductive elastic roller is incorporated as a developing roller into an image forming apparatus, traces due to pressure-contacting with a photosensitive drum, a blade, a feeding roller or the like are hardly caused on the surface of the roller and a stripe-shaped bad imaging is hardly caused in the resulting image.

The elastic layer is preferable to have a volume resistivity of $10^4$-$10^{10}$ Ωcm. When the volume resistivity of the elastic layer is less than $10^4$ Ωcm, if the roller is used as a developing roller, charge may leak to the photosensitive drum and so on, or the roller itself may be broken due to the voltage, while when it exceeds $10^{10}$ Ωcm, fogging is easily caused.

The elastic layer is preferable to have a thickness of 1-3000 μm. When the thickness of the elastic layer is not less than 1 μm, the conductive elastic roller has a sufficient elasticity and the damage to toners is sufficiently small, while when it is not more than 3000 μm, ultraviolet light irradiated can sufficiently arrive at a deep portion of the elastic layer to surely cure the raw material for the elastic layer, and the amount of the expensive ultraviolet-curing resin raw material used can be decreased.

The conductive elastic roller according to the invention can be prepared by applying the raw material for the elastic layer onto the outer surface of the shaft member and then curing through irradiation of ultraviolet light. As described in detail for the second conductive elastic roller according to the invention, the roller is prepared, for example, by preliminarily dissolving the ion conductive agent (E) with the diluent (D), mixing the ion conductive agent (E) diluted with the diluent (D), the urethane acrylate oligomer (A) and the photo-polymerization initiator (B) to prepare a raw material for the elastic layer, applying the raw material onto the outer surface of the shaft member, and then curing through irradiation of ultraviolet light. In the conductive elastic roller according to the invention, therefore, it is possible to prepare the elastic layer in a short time without requiring a large quantity of heat energy in the preparation of the elastic layer. Also, a curing furnace or the like is not required for the formation of the elastic layer, so that considerable expense for equipment is not required. As the method for applying the raw material for the elastic layer onto the outer surface of the shaft member are mentioned a spraying method, a roll-coating method, a dipping method, a die coating method and the like. As a light source used for the ultraviolet irradiation are mentioned a mercury vapor lamp, a high pressure mercury vapor lamp, a super high pressure mercury vapor lamp, a metal halide lamp, a xenon lamp and the like. The conditions for the ultraviolet irradiation are properly selected depending on the components included in the raw material for the elastic layer, the composition, the amount applied and the like, i.e. the irradiation intensity, integral light quantity and so on may be adjusted properly.

The above-mentioned conductive elastic roller according to the invention can be used as a developing roller, a charging roller, a toner feed roller, a transfer roller, a paper feed roller, a cleaning roller, a pressure roller for fixing or the like in an image forming apparatus, and are particularly preferable as the developing roller and the charging roller.

<Image Forming Apparatus>

Figure 2:
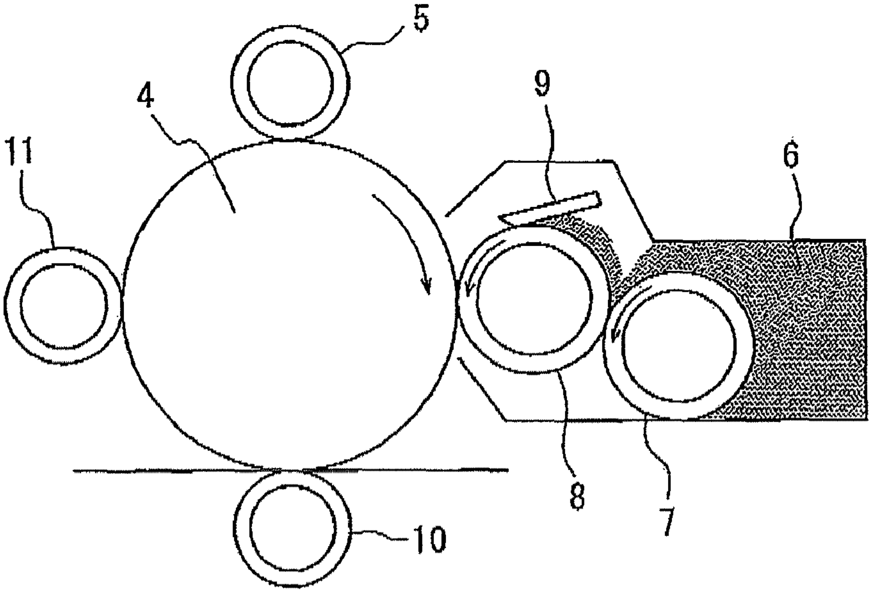
FIG. 2 is a partial sectional view of an embodiment of the image forming apparatus according to the invention.

The image forming apparatus according to the invention is characterized by comprising the above-mentioned conductive elastic roller and is preferable to comprise the roller as at least one of the developing roller and the charging roller. The image forming apparatus according to the invention is not particularly limited as far as it uses the conductive elastic roller, and can be manufactured by the known method. The image forming apparatus according to the invention will be described in detail below with reference to FIG. 2. FIG. 2 is a partial sectional view of an embodiment of the image forming apparatus according to the invention. The illustrated image forming apparatus comprises Organic Photoconductors 4 carrying an electrostatic latent image, a charging roller 5 positioned near to the Organic Photoconductors 4 (upside in the figure) for charging the Organic Photoconductors 4, a toner feed roller 7 for supplying toners 6, a developing roller 8 disposed between the toner feed roller 7 and the Organic Photoconductors 4, a stratification blade 9 disposed near to the developing roller 8 (upside in the figure), a transfer roller 10 positioned near to the Organic Photoconductors 4 (downside in the figure), and a cleaning roller 11 disposed adjoining to the Organic Photoconductors 4. Moreover, the image forming apparatus according to the invention may further comprise well-known members (not shown) usually used for the image forming apparatus.

In the illustrated image forming apparatus, the charging roller 5 is contacted with the Organic Photoconductors 4, and a voltage is applied between the Organic Photoconductors 4 and the charging roller 5 to charge the Organic Photoconductors 4 at a constant electric potential, and then an electrostatic latent image is formed on the Organic Photoconductors 4 by an exposure machine (not shown). Then, the toners 6 are supplied from the toner feed roller 7 to the Organic Photoconductors 4 through the developing roller 8 by rotating the Organic Photoconductors 4, the toner feed roller 7 and the developing roller 8 in the direction shown by arrows in the figure. The toners 6 on the developing roller 8 are made to be a uniform thin layer by the stratification blade 9, while the developing roller 8 and the Organic Photoconductors 4 are rotated in contact with each other, whereby the toners 6 are attached from the developing roller 8 to the electrostatic latent image on the Organic Photoconductors 4 to visualize the latent image. The toners 6 attached to the latent image are transferred to a recording medium such as a paper or the like by the transfer roller 10, while the remaining toners 6 on the Organic Photoconductors 4 after the transferring are removed by the cleaning roller 11. In the image forming apparatus according to the invention, it is possible to stably form an excellent image by using the above-mentioned conductive elastic roller of the invention as at least one of the charging roller 5, the toner feed roller 7, the developing roller 8, the transfer roller 10 and the cleaning roller 11, and preferably as at least one of the charging roller 5 and the developing roller 8.

EXAMPLES

The following examples are given in illustration of the invention and are not intended as limitations thereof.

Example 1

100 parts by mass of bifunctional polyether polyol having a proportion of primary hydroxyl groups in hydroxyl groups located at molecular ends of 70% obtained by an addition polymerization of propylene oxide to propylene glycol [PRIMEPOLE PX-1000 made by Sanyo Chemical Industries, Ltd., weight average molecular weight: 1000, hydroxyl value: 111 mg KOH/g], 27.49 parts by mass of isophorone diisocyanate [isocyanate group/hydroxyl group of polyol=5/4 (molar ratio)] and 0.01 part by mass of dibutyltin dilaurate are reacted at 70° C. for 2 hours while mixing under heating with stirring to synthesize a urethane prepolymer having isocyanate groups at both ends of its molecular chain. Furthermore, 100 parts by mass of the urethane prepolymer are reacted with 5.73 parts by mass of 2-hydroxyethyl acrylate (HEA) at 70° C. for 2 hours while mixing with stirring to synthesize a urethane acrylate oligomer (A-1) having a molecular weight of 5000 (calculated value).

60.0 parts by mass of the urethane acrylate oligomer (A-1), 30.0 parts by mass of an acrylate monomer made by Kyoei-Sha Chemical Co., Ltd., "LIGHT-ACRYLATE IM-A (isomyristyl acrylate)", 10.0 parts by mass of an acrylate monomer made by SHIN-NAKAMURA CHEMICAL CO., LTD., "NK ESTER A-SA (P-acryloyloxyethyl hydrogen succinate)", 0.5 parts by mass of a photo-polymerization initiator made by Ciba Specialty Chemicals Co., Ltd., "IRGACURE 184D" and 2.0 parts by mass of an ion conductive agent made by Sanko Chemical Industry Co., Ltd., "Sankonol (registered trademark) PEO-20R" are stirred and mixed by an agitator at a liquid temperature of 70° C. and 60 revolutions/minute for 1 hour, and then the resulting mixture is filtered to obtain a raw UV-curing resin material.

The raw UV-curing resin material is poured into a mold having a cavity of 12.7 mm in depth and 29 mm in inner diameter, capped with a quartz glass plate and then exposed to UV at a UV-irradiation intensity of 700 mW/cm$^2$ for 10 seconds to obtain a cylindrical UV-cured resin sample for measuring properties. This sample has an Asker C hardness at a plane part of 57.9 degrees [measured by an apparatus made by KOBUNSHI KEIKI Co., Ltd.] and a compression residual strain of 0.7%. Then, the raw UV-curing resin material is applied onto a conductive roller substrate made of polybutylene terephthalate (PBT) resin having an outer diameter of 17.0 mm and inserted with a metal shaft having an outer diameter of 6.0 mm at a thickness of 1500 μm through a die coater, during which the raw UV-curing resin material is cured through spot UV-irradiation. The thus formed roller provided with the elastic layer made of the UV-cured resin is further irradiated with UV at a UV-irradiation intensity of 700 mW/cm$^2$ for 5 seconds while rotating under a nitrogen atmosphere.

A raw UV-curing resin material containing microparticles with a hardness higher than that of the elastic layer is applied on the surface of the roller with the elastic layer made of the UV-cured resin through a roll coater and irradiated with UV to obtain a low-hardness roller made of UV-cured resin having a UV coating on its surface and a roller outer diameter of 20.0 mm. This roller is incorporated into an electro-photographic apparatus as a developing roller to print pure white, pure black and grayscale images, and as a result, good images can be obtained.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, good images can be obtained. After the image evaluation, the surface of the roller is observed, and as a result, a surface modification due to the staining of the Organic Photoconductors and a surface deformation due to pressure contact are not observed.

Example 2

100 parts by mass of polyether polyol made by Sanyo Chemical Industries, Ltd., "PRIMEPOLE PX-1000", 25.66 parts by mass of isophorone diisocyanate [isocyanate group/hydroxyl group of polyol=7/6 (molar ratio)] and 0.01 parts by mass of dibutyltin dilaurate are reacted at 70° C. for 2 hours while mixing under heating with stirring to synthesize a urethane prepolymer having isocyanate groups at both ends of its molecular chain. Furthermore, 100 parts by mass of the urethane prepolymer are reacted with 3.82 parts by mass of 2-hydroxyethyl acrylate at 70° C. for 2 hours while mixing with stirring to synthesize a urethane acrylate oligomer (A-2) having a molecular weight of 8000 (calculated value).

50.0 parts by mass of the urethane acrylate oligomer (A-2), 40.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA", 0.5 parts by mass of a photo-polymerization initiator made by Ciba Specialty Chemicals Co., Ltd., "IRGACURE 184D" and 2.0 parts by mass of an ion conductive agent made by Sanko Chemical Industry Co., Ltd., "Sankonol PEO-20R" are stirred and mixed by an agitator at a liquid temperature of 70° C. and 60 revolutions/minute for 1 hour, and then the resulting mixture is filtered to obtain a raw UV-curing resin material.

A cylindrical UV-cured resin sample for measuring properties is made by using the raw UV-curing resin material in the same manner as in Example 1. The sample has an Asker C hardness at a plane part of 45.3 degrees [measured by an apparatus made by KOBUNSHI KEIKI Co., Ltd.] and a compression residual strain of 1.5%.

Also, a roller made of UV-cured resin is prepared by using the raw UV-curing resin material in the same manner as in Example 1. The roller is incorporated into an electro-photographic apparatus as a developing roller to print pure white, pure black and grayscale images, and as a result, good images can be obtained.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, good images can be obtained. After the image evaluation, the surface of the roller is observed, and as a result, a surface modification due to the staining of the Organic Photoconductors and a surface deformation due to pressure contact are not observed.

Example 3

70 parts by mass of polyether polyol made by Sanyo Chemical Industries, Ltd., "PRIMEPOLE PX-1000", 30.0 parts by mass of an acrylate monomer made by Kyoei-Sha Chemical Co., Ltd., "LIGHT-ACRYLATE IM-A", 17.96 parts by mass of isophorone diisocyanate [isocyanate group/hydroxyl group of polyol=7/6 (molar ratio)] and 0.01 parts by mass of dibutyltin dilaurate are reacted at 70° C. for 2 hours while mixing under heating with stirring to synthesize a urethane prepolymer having isocyanate groups at both ends of its molecular chain. Furthermore, 100 parts by mass of the urethane prepolymer are reacted with 2.68 parts by mass of 2-hydroxyethyl acrylate at 70° C. for 2 hours while mixing with stirring to synthesize a urethane acrylate oligomer (A-3) having a molecular weight of 8000 (calculated value).

80.0 parts by mass of the urethane acrylate oligomer (A-3), 10.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA", 0.5 parts by mass of a photo-polymerization initiator made by Ciba Specialty Chemicals Co., Ltd., "IRGACURE 184D" and 2.0 parts by mass of an ion conductive agent made by Sanko Chemical Industry Co., Ltd., "Sankonol PEO-20R" are stirred and mixed by an agitator at a liquid temperature of 70° C. and 60 revolutions/minute for 1 hour, and then the resulting mixture is filtered to obtain a raw UV-curing resin material.

A cylindrical UV-cured resin sample for measuring properties is made by using the raw UV-curing resin material in the same manner as in Example 1. The sample has an Asker C hardness at a plane part of 44.6 degrees [measured by an apparatus made by KOBUNSHI KEIKI Co., Ltd.] and a compression residual strain of 1.6%.

Also, a roller made of UV-cured resin is prepared by using the raw UV-curing resin material in the same manner as in Example 1. The roller is incorporated into an electro-photographic apparatus as a developing roller to print pure white, pure black and grayscale images, and as a result, good images can be obtained.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, good images can be obtained. After the image evaluation, the surface of the roller is observed, and as a result, a surface modification due to the staining of the Organic Photoconductors and a surface deformation due to pressure contact are not observed.

Comparative Example 1

100 parts by mass of bifunctional polyether polyol having a proportion of primary hydroxyl groups in hydroxyl groups located at molecular ends of 2% obtained by an addition polymerization of propylene oxide to propylene glycol [SANNIX PP-1000 made by Sanyo Chemical Industries, Ltd., weight average molecular weight: 1000, hydroxyl value: 111 mg KOH/g], 27.49 parts by mass of isophorone diisocyanate [isocyanate group/hydroxyl group of polyol=5/4 (molar ratio)] and 0.01 parts by mass of dibutyltin dilaurate are reacted at 70° C. for 2 hours while mixing under heating with stirring to synthesize a urethane prepolymer having isocyanate groups at both ends of its molecular chain. Furthermore, 100 parts by mass of the urethane prepolymer are reacted with 5.73 parts by mass of 2-hydroxyethyl acrylate at 70° C. for 2 hours while mixing with stirring to synthesize a urethane acrylate oligomer (A-4) having a molecular weight of 5000 (calculated value).

60.0 parts by mass of the urethane acrylate oligomer (A-4), 30.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA", 0.5 parts by mass of a photo-polymerization initiator made by Ciba Specialty Chemicals Co., Ltd., "IRGACURE 184D" and 2.0 parts by mass of an ion conductive agent made by Sanko Chemical Industry Co., Ltd., "Sankonol PEO-20R" are stirred and mixed by an agitator at a liquid temperature of 70° C. and 60 revolutions/minute for 1 hour, and then the resulting mixture is filtered to obtain a raw UV-curing resin material.

A cylindrical UV-cured resin sample for measuring properties is made by using the raw UV-curing resin material in the same manner as in Example 1. The sample has an Asker C hardness at a plane part of 53.2 degrees [measured by an apparatus made by KOBUNSHI KEIKI Co., Ltd.] and a compression residual strain of 5.5%.

Also, a roller made of UV-cured resin is prepared by using the raw UV-curing resin material in the same manner as in Example 1. The roller is incorporated into an electro-photographic apparatus as a developing roller to print pure white, pure black and grayscale images, and as a result, good images can be obtained.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, plural white lines and black lines appear in the image. After the image evaluation, the surface of the roller is observed, and as a result, a surface modification due to the staining of the Organic Photoconductors and a surface deformation due to pressure contact are observed.

Comparative Example 2

100 parts by mass of polyether polyol made by Sanyo Chemical Industries, Ltd., "SANNIX PP-1000", 25.66 parts by mass of isophorone diisocyanate [isocyanate group/hydroxyl group of polyol=7/6 (molar ratio)] and 0.01 parts by mass of dibutyltin dilaurate are reacted at 70° C. for 2 hours while mixing under heating with stirring to synthesize a urethane prepolymer having isocyanate groups at both ends of its molecular chain. Furthermore, 100 parts by mass of the urethane prepolymer are reacted with 3.82 parts by mass of 2-hydroxyethyl acrylate at 70° C. for 2 hours while mixing with stirring to synthesize a urethane acrylate oligomer (A-5) having a molecular weight of 8000 (calculated value).

50.0 parts by mass of the urethane acrylate oligomer (A-5), 40.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA", 0.5 parts by mass of a photo-polymerization initiator made by Ciba Specialty Chemicals Co., Ltd., "IRGACURE 184D" and 2.0 parts by mass of an ion conductive agent made by Sanko Chemical Industry Co., Ltd., "Sankonol PEO-20R" are stirred and mixed by an agitator at a liquid temperature of 70° C. and 60 revolutions/minute for 1 hour, and then the resulting mixture is filtered to obtain a raw UV-curing resin material.

A cylindrical UV-cured resin sample for measuring properties is made by using the raw UV-curing resin material in the same manner as in Example 1. The sample has an Asker C hardness at a plane part of 44.3 degrees [measured by an apparatus made by KOBUNSHI KEIKI Co., Ltd.] and a compression residual strain of 6.8%.

Also, a roller made of UV-cured resin is prepared by using the raw UV-curing resin material in the same manner as in Example 1. The roller is incorporated into an electro-photographic apparatus as a developing roller to print pure white, pure black and grayscale images, and as a result, good images can be obtained.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, plural white lines and black lines appear in the image. After the image evaluation, the surface of the roller is observed, and as a result, a surface modification due to the staining of the Organic Photoconductors and a surface deformation due to pressure contact are observed.

TABLE 1

Formulation of raw material in synthesis of urethane acrylate oligomer and properties of product

| | | Example 1 | Example 2 | Example 3 | Comparative Example 1 | Comparative Example 2 |
|---|---|---|---|---|---|---|
| Kind of urethane acrylate oligomer | | (A-1) | (A-2) | (A-3) | (A-4) | (A-5) |
| PRIMEPOLE PX-1000 | parts by mass | 100.00 | 100.00 | 70.00 | — | — |
| SANNIX PP-1000 | | — | — | — | 100.00 | 100.00 |
| LIGHT-ACRYLATE IM-A (dilution monomer) | | — | — | 30.00 | — | — |
| Isophorone diisocyanate | | 27.49 | 25.66 | 17.96 | 27.49 | 25.66 |
| Dibutyltin dilaurate | | 0.01 | 0.01 | 0.01 | 0.01 | 0.01 |
| 2-Hydroxyethyl acrylate | | 5.73 | 3.82 | 2.68 | 5.73 | 3.82 |
| Molar ratio of isocyanate group/hydroxyl group | | 5/4<br>1.25 | 7/6<br>1.17 | 7/6<br>1.17 | 5/4<br>1.25 | 7/6<br>1.17 |
| Molecular weight of formed oligomer (calculated value) | | 5000 | 8000 | 8000 | 5000 | 8000 |
| Functionality of formed oligomer | | 2 | 2 | 2 | 2 | 2 |
| Viscosity at 25° C. of formed oligomer (Pa · s) | | 200< | 200< | 31.6 | 200< | 200< |

TABLE 2

Formulation of raw material and properties of UV-cured resin as well as image evaluation result

| | | | Example 1 | Example 2 | Example 3 | Comparative Example 1 | Comparative Example 2 |
|---|---|---|---|---|---|---|---|
| Oligomer | Urethane acrylate oligomer (A-1) | parts by mass | 60.0 | — | — | — | — |
| | Urethane acrylate oligomer (A-2) | | — | 50.0 | — | — | — |
| | Urethane acrylate oligomer (A-3) | | — | — | 80.0 | — | — |
| | Urethane acrylate oligomer (A-4) | | — | — | — | 60.0 | — |
| | Urethane acrylate oligomer (A-5) | | — | — | — | — | 50.0 |
| Monomer | LIGHT-ACRYLATE IM-A | | 30.0 | 40.0 | 10.0 | 30.0 | 40.0 |
| | NK ESTER A-SA | | 10.0 | 10.0 | 10.0 | 10.0 | 10.0 |
| Initiator | IRUGACURE 184D | | 0.5 | 0.5 | 0.5 | 0.5 | 0.5 |
| Conductive agent | Sankonol PEO-20R | | 2.0 | 2.0 | 2.0 | 2.0 | 2.0 |
| Viscosity of raw UV-curing resin material (Pa · s) | | | 8.5 | 5.9 | 9.6 | 8.3 | 5.8 |
| Asker C hardness | | | 57.9 | 45.3 | 44.6 | 53.2 | 44.3 |
| Compression residual strain (degree) | | | 0.7 | 1.5 | 1.6 | 5.5 | 6.8 |
| Staining test of Organic Photoconductors | | | Good | Good | Good | Bad | Bad |

As seen from the results of Examples 1-3, the elastic layer composed of an ultraviolet-curing type resin formed by curing a raw material for the elastic layer comprising a urethane acrylate oligomer (A) synthesized by using a polyether polyol (a1) having a proportion of primary hydroxyl groups in hydroxyl groups located at molecular ends of not less than 40%, a photo-polymerization initiator (B) and a conductive agent (C) through ultraviolet irradiation is low in the hardness and small in the compression residual strain, and the conductive elastic roller comprising the elastic layer does not stain the Organic Photoconductors.

On the other hand, as seen from the results of Comparative Examples 1-2, the elastic layer formed by using a urethane acrylate oligomer synthesized by not using the polyether polyol (a1) having a proportion of primary hydroxyl groups in hydroxyl groups located at molecular ends of not less than 40% is large in the compression residual strain, and a conductive elastic roller comprising the elastic layer stains the Organic Photoconductors to cause a bad imaging.

Then, a urethane acrylate oligomer (A-6) used in Examples 4-5 and Comparative Examples 3-4 in common is synthesized.

Synthesis Example of Urethane Acrylate Oligomer (A-6)

100 parts by mass of a bifunctional high purity polyol having a molecular weight of 5,500 [PREMINOL S-4006 made by Asahi Glass Co., Ltd., a polyol composed of a propylene oxide (PO) chain, hydroxyl value=21.1 mg KOH/g], 6.69 parts by mass of isophorone diisocyanate [isocyanate group/hydroxyl group of polyol=8/5=1.60 (molar ratio)] and 0.01 parts by mass of dibutyltin dilaurate are reacted at 70° C. for 2 hours while mixing under warming with stirring to synthesize a urethane prepolymer having isocyanate groups at both ends of its molecular chain. Furthermore, 100 parts by mass of the urethane prepolymer is reacted with 2.62 parts by mass of 2-hydroxyethyl acrylate (HEA) at 70° C. for 2 hours while mixing with stirring to synthesize a urethane acrylate oligomer (A-6) having a molecular weight of 11,000. The resulting urethane acrylate oligomer (A-6) has a viscosity at 25° C. of 60,000 mPas as measured by a B-type viscometer.

Example 4

60.0 parts by mass of the urethane acrylate oligomer (A-6), 30.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA (β-acryloyloxyethyl hydrogen succinate)", 0.5 parts by mass of a photo-polymerization initiator made by Ciba Specialty Chemicals Co., Ltd., "IRGACURE 184D" and 1.33 parts by mass of "Sankonol IM-A-30R" made by Sanko Chemical Industry Co., Ltd. [a mixture of 70% by mass of IM-A (isomyristyl acrylate, a functionality of 1, a molecular weight of 268, a diluent) and 30% by mass of $Li(CF_3SO_2)_2N$ (an ion conductive agent)] are stirred and mixed by an agitator at a liquid temperature of 70° C. and 60 revolutions/minute for 1 hour, and the resulting mixture is filtered to obtain a raw UV-curing resin material.

The raw UV-curing resin material is poured into a mold having a cavity of 12.7 mm in depth and 29 mm in inner diameter, capped with a quartz glass plate and then exposed to UV at a UV-irradiation intensity of 700 mW/cm$^2$ for 10 seconds to obtain a cylindrical UV-cured resin sample for measuring properties. This sample has an Asker C hardness at a plane part of 50.0 degrees [measured by an apparatus made by KOBUNSHI KEIKI Co., Ltd.].

Also, the raw UV-curing resin material is charged between two quartz glass plates through a spacer of 2.0 mm to prepare a sheet sample of 2.0 mm. If necessary, the sheet sample can be easily peeled by interposing a PTFE sheet between the UV-cured resin and the quartz glass positioned opposite to the UV-irradiated surface. The thus obtained sample is left to stand at 20° C. and 50% RH (NN condition) for 2 days and set in a BOX-type resistance measuring box of JIS, and a resistance thereof is measured at an applied voltage of 100 V by means of a resistance meter made by Advantest, and as a result, the volume resistivity is $1.59\times10^7$ Ωcm ($10^{7.20}$ Ωcm).

Then, the raw UV-curing resin material is applied onto a conductive roller substrate made of polybutylene terephthalate (PBT) resin having an outer diameter of 17.0 mm and inserted with a metal shaft having an outer diameter of 6.0 mm at a thickness of 1500 μm through a die coater, during which the raw UV-curing resin material is cured through spot UV-irradiation. The thus formed roller provided with the elastic layer made of the UV-cured resin is further irradiated with UV at a UV-irradiation intensity of 700 mW/cm$^2$ for 5 seconds while rotating under a nitrogen atmosphere.

A raw UV-curing resin material containing microparticles with a hardness higher than that of the elastic layer is applied onto the surface of the thus obtained roller provided with the elastic layer made of the UV-cured resin through a roll coater and irradiated with UV to obtain a low-hardness roller made of UV-cured resin having a UV coating on its surface and a roller outer diameter of 20.0 mm. This roller is incorporated into an electro-photographic apparatus as a developing roller, and left to stand under each of NN condition (20° C. and 50% RH), LL condition (12° C. and 10% RH) and HH condition (32.5° C. and 85% RH) for 48 hours to print pure white, pure black and grayscale images, and as a result, good images can be obtained on each condition.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, good images can be obtained and a bad imaging due to the staining of the Organic Photoconductors and the deformation of the roller is not observed.

Example 5

60.0 parts by mass of the urethane acrylate oligomer (A-6), 30.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA (β-acryloyloxyethyl hydrogen succinate)", 0.5 parts by mass of a photo-polymerization initiator made by Ciba Specialty Chemicals Co., Ltd., "IRGACURE 184D" and 0.8 parts by mass of "Sankonol MTG-α-50R" made by Sanko Chemical Industry Co., Ltd. [a mixture of 50% by mass of MTG-α (methoxytriethylene glycol acrylate, a functionality of 1, a molecular weight of 218, a diluent) and 50% by mass of $Li(CF_3SO_2)_2N$ (an ion conductive agent)] are stirred and mixed by an agitator at a liquid temperature of 70° C. and 60 revolutions/minute for 1 hour, and the resulting mixture is filtered to obtain a raw UV-curing resin material.

The raw UV-curing resin material is poured into a mold having a cavity of 12.7 mm in depth and 29 mm in inner diameter, capped with a quartz glass plate and then exposed to UV at a UV-irradiation intensity of 700 mW/cm$^2$ for 10 seconds to obtain a cylindrical UV-cured resin sample for measuring properties. This sample has an Asker C hardness at a plane part of 51 degrees [measured by an apparatus manufactured by KOBUNSHI KEIKI Co., Ltd.].

Also, the raw UV-curing resin material is charged between two quartz glass plates through a spacer of 2.0 mm to prepare a sheet sample of 2.0 mm. If necessary, the sheet sample can be easily peeled by interposing a PTFE sheet between the UV-cured resin and the quartz glass positioned opposite to the UV-irradiated surface. The thus obtained sample is left to stand at 20° C. and 50% RH (NN condition) for 2 days and set in a BOX-type resistance measuring box of JIS, and a resistance thereof is measured at an applied voltage of 100 V by means of a resistance meter made by Advantest, and as a result, the volume resistivity is $1.53\times10^7$ Ωcm ($10^{7.18}$ Ωcm).

Then, the raw UV-curing resin material is applied onto a conductive roller substrate made of polybutylene terephthalate (PBT) resin having an outer diameter of 17.0 mm and inserted with a metal shaft having an outer diameter of 6.0 mm at a thickness of 1500 μm through a die coater, during which the raw UV-curing resin material is cured through spot UV-irradiation. The thus formed roller provided with the elastic layer made of the UV-cured resin is further irradiated with UV at a UV-irradiation intensity of 700 mW/cm$^2$ for 5 seconds while rotating under a nitrogen atmosphere.

A raw UV-curing resin material containing microparticles with a hardness higher than that of the elastic layer is applied on the surface of the thus obtained roller provided with the elastic layer made of the UV-cured resin through a roll coater and irradiated with UV to obtain a low-hardness roller made of UV-cured resin having a UV coating on its surface and a roller outer diameter of 20.0 mm. This roller is incorporated into an electro-photographic apparatus as a developing roller, and left to stand under each of NN condition (20° C. and 50% RH), LL condition (12° C. and 10% RH) and HH condition (32.5° C. and 85% RH) for 48 hours to print pure white, pure black and grayscale images, and as a result, good images can be obtained on each condition.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, good images can be obtained and a bad imaging due to the staining of the Organic Photoconductors and the deformation of the roller is not observed.

Comparative Example 3

60.0 parts by mass of the urethane acrylate oligomer (A-6), 30.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA (β-acryloyloxyethyl hydrogen succinate)", 0.5 parts by mass of a photo-polymerization initiator made by Ciba Specialty Chemicals Co., Ltd., "IRGACURE 184D" and 2.0 parts by mass of "Sankonol PEO-20R" made by Sanko Chemical Industry Co., Ltd. [a mixture of 80% by mass of propylene oxide (PO)-based polyether polyol (a hydroxyl group number of 3, a molecular weight of 3,000, a diluent) and 20% by mass of $Li(CF_3SO_2)_2N$ (an ion conductive agent)] are stirred and mixed by an agitator at a liquid temperature of 70° C. and 60 revolutions/minute for 1 hour, and the resulting mixture is filtered to obtain a raw UV-curing resin material.

The raw UV-curing resin material is poured into a mold having a cavity of 12.7 mm in depth and 29 mm in inner diameter, capped with a quartz glass plate and then exposed to UV at a UV-irradiation intensity of 700 mW/cm$^2$ for 10 seconds to obtain a cylindrical UV-cured resin sample for measuring properties. This sample has an Asker C hardness at a plane part of 49 degrees [measured by an apparatus made by KOBUNSHI KEIKI Co., Ltd.].

Also, the raw UV-curing resin material is charged between two quartz glass plates through a spacer of 2.0 mm to prepare a sheet sample of 2.0 mm. If necessary, the sheet sample can be easily peeled by interposing a PTFE sheet between the UV-cured resin and the quartz glass positioned opposite to the UV-irradiated surface. The thus obtained sample is left to stand at 20° C. and 50% RH(NN condition) for 2 days and set in a BOX-type resistance measuring box of JIS, and a resistance thereof is measured at an applied voltage of 100 V by means of a resistance meter made by Advantest, and as a result, the volume resistivity is $1.60\times10^7$ Ωcm ($10^{7.20}$ Ωcm).

Then, the raw UV-curing resin material is applied onto a conductive roller substrate made of polybutylene terephthalate (PBT) resin having an outer diameter of 17.0 mm and inserted with a metal shaft having an outer diameter of 6.0 mm at a thickness of 1500 μm through a die coater, during which the raw UV-curing resin material is cured through spot UV-irradiation. The thus formed roller provided with the elastic layer made of the UV-cured resin is further irradiated with UV at a UV-irradiation intensity of 700 mW/cm$^2$ for 5 seconds while rotating under a nitrogen atmosphere.

A raw UV-curing resin material containing microparticles with a hardness higher than that of the elastic layer is applied on the surface of the thus obtained roller provided with the elastic layer made of the UV-cured resin through a roll coater and irradiated with UV to obtain a low-hardness roller made of UV-cured resin having a UV coating on its surface and a roller outer diameter of 20.0 mm. This roller is incorporated into an electro-photographic apparatus as a developing roller, and left to stand under each of NN condition (20° C. and 50% RH), LL condition (12° C. and 10% RH) and HH condition (32.5° C. and 85% RH) for 48 hours to print pure white, pure black and grayscale images, and as a result, good images can be obtained on each condition.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, white lines equally spaced appear in the image and it is confirmed from a distance of the space that the bad imaging is caused by the staining of the Organic Photoconductors and traces due to pressure-contacting with a blade.

Comparative Example 4

60.0 parts by mass of the urethane acrylate oligomer (A-6), 30.0 parts by mass of an acrylate monomer made by Kyoei-Sha Chemical Co., Ltd., "LIGHT-ACRYLATE IM-A", 10.0 parts by mass of an acrylate monomer made by SHIN-NAKAMURA CHEMICAL CO., LTD., "NK ESTER A-SA (β-acryloyloxyethyl hydrogen succinate)", 0.5 parts by mass of a photo-polymerization initiator made by Ciba Specialty Chemicals Co., Ltd., "IRGACURE 184D" and 2.0 parts by mass of "Sankonol PETA-20R" made by Sanko Chemical Industry Co., Ltd. [a mixture of 80% by mass of pentaerythritol triacrylate (a functionality of 3, a molecular weight of 298) and 20% by mass of $Li(CF_3SO_2)_2N$ (an ion conductive agent)] are stirred and mixed by an agitator at a liquid temperature of 70° C. and 60 revolutions/minute for 1 hour, and the resulting mixture is filtered to obtain a raw UV-curing resin material.

The raw UV-curing resin material is poured into a mold having a cavity of 12.7 mm in depth and 29 mm in inner diameter, capped with a quartz glass plate and then exposed to UV at a UV-irradiation intensity of 700 mW/cm$^2$ for 10 seconds to obtain a cylindrical UV-cured resin sample for measuring properties. This sample has an Asker C hardness at a plane part of 67 degrees [measured by an apparatus made by KOBUNSHI KEIKI Co., Ltd.].

Also, the raw UV-curing resin material is charged between two quartz glass plates through a spacer of 2.0 mm to prepare a sheet sample of 2.0 mm. If necessary, the sheet sample can be easily peeled by interposing a PTFE sheet between the UV-cured resin and the quartz glass positioned opposite to the UV-irradiated surface. The thus obtained sample is left to stand at 20° C. and 50% RH(NN condition) for 2 days and set in a BOX-type resistance measuring box of JIS, and a resistance thereof is measured at an applied voltage of 100 V by means of a resistance meter made by Advantest, and as a result, the volume resistivity is $8.67\times10^6$ Ωcm ($10^{6.94}$ Ωcm).

Then, the raw UV-curing resin material is applied onto a conductive roller substrate made of polybutylene terephthalate (PBT) resin having an outer diameter of 17.0 mm and inserted with a metal shaft having an outer diameter of 6.0 mm at a thickness of 1500 μm through a die coater, during which the raw UV-curing resin material is cured through spot UV-irradiation. The thus formed roller provided with the elastic layer made of the UV-cured resin is further irradiated with UV at a UV-irradiation intensity of 700 mW/cm$^2$ for 5 seconds while rotating under a nitrogen atmosphere.

A raw UV-curing resin material containing microparticles with a hardness higher than that of the elastic layer is applied on the surface of the thus obtained roller provided with the elastic layer made of the UV-cured resin through a roll coater and irradiated with UV to obtain a roller made of UV-cured resin having a UV coating on its surface and a roller outer diameter of 20.0 mm. This roller is incorporated into an electro-photographic apparatus as a developing roller, and left to stand under each of NN condition (20° C. and 50% RH), LL condition (12° C. and 10% RH) and HH condition (32.5° C. and 85% RH) for 48 hours to print pure white, pure black and grayscale images, and as a result, the elastic layer is too high in the hardness, and the follow-up properties of the obtained roller to other members are bad, and concentration unevenness occurs on each condition.

Then, for a staining test of Organic Photoconductors, a cartridge incorporated with the roller is left to stand in a light-tight convection oven at 50° C. for 5 days and taken out therefrom and left to stand under an environment of 20° C. and 50% RH for 1 hour, and then 50 sheets of gray images are printed, and as a result, white lines equally spaced appear in the image and it is confirmed from a distance of the space that the bad imaging is caused by the staining of the Organic Photoconductors and traces due to pressure-contacting with a blade.

TABLE 3

Formulation of raw material and properties of UV-cured resin as well as image evaluation result

| | | | Example 4 | Example 5 | Comparative Example 3 | Comparative Example 4 |
|---|---|---|---|---|---|---|
| Oligomer | Urethane acrylate oligomar (A-6) | parts by | 60.0 | 60.0 | 60.0 | 60.0 |
| Monomer | LIGHT-ACRYLATE IM-A | mass | 30.0 | 30.0 | 30.0 | 30.0 |
| | NK ESTER A-SA | | 10.0 | 10.0 | 10.0 | 10.0 |
| Initiator | IRUGACURE 184D | | 0.5 | 0.5 | 0.5 | 0.5 |

TABLE 3-continued

Formulation of raw material and properties of UV-cured resin as well as image evaluation result

| | | Example 4 | Example 5 | Comparative Example 3 | Comparative Example 4 |
|---|---|---|---|---|---|
| Diluent containing an ion conductive agent | Sankonol IM-A-30R | 1.33 | — | — | — |
| | Sankonol MTG-A-50R | — | 0.8 | — | — |
| | Sankonol PEO-20R | — | — | 2.0 | — |
| | Sankonol PETA-20R | — | — | — | 2.0 |
| | $Li(CF_3SO_2)_2N$ (ion conductive agent) *1 | 0.4 | 0.4 | 0.4 | 0.4 |
| Asker C hardness (degree) | | 50 | 51 | 49 | 67 |
| Volume resistivity (Ωcm) | | $1.59 \times 10^7$ ($10^{7.20}$) | $1.53 \times 10^7$ ($10^{7.18}$) | $1.60 \times 10^7$ ($10^{7.20}$) | $8.67 \times 10^6$ ($10^{6.94}$) |
| Image evaluation | L/L | Good | Good | Good | Bad |
| | N/N | Good | Good | Good | Bad |
| | H/H | Good | Good | Good | Bad |
| Staining test of Organic Photoconductors | | Good | Good | Bad | Bad |

*1 Parts by mass of an ion conductive agent included in a diluent containing the ion conductive agent are shown.

As seen from the results of Examples 4-5, the elastic layer composed of an ultraviolet-curing type resin formed by curing a raw material for the elastic layer comprising a urethane acrylate oligomer (A), a photo-polymerization initiator (B) and an ion conductive agent (E) diluted with a diluent (D) composed of an ultraviolet-curable acrylate monomer (F) having a functionality of 1-2 and a molecular weight of 100-1000 through ultraviolet irradiation is low in the hardness, and the conductive elastic roller comprising the elastic layer does not stain the Organic Photoconductors.

On the other hand, as seen from the results of Comparative Example 3, the conductive elastic roller comprising the elastic layer formed by using a propylene oxide (PO)-based polyether polyol as a diluent of an ion conductive agent stains the Organic Photoconductors due to the bleeding of the diluent to cause a bad imaging. Also, as seen from the results of Comparative Example 4, the elastic layer formed by using pentaerythritol triacrylate as a diluent of an ion conductive agent is high in the Asker C hardness, and the concentration unevenness occurs in the image evaluation, and moreover the conductive elastic roller comprising the elastic layer stains the Organic Photoconductors to cause a bad imaging.

The invention claimed is:

1. A conductive elastic roller comprising a shaft member and one or more elastic layers disposed on an outside of the shaft member in a radial direction, characterized in that at least one of the elastic layers is composed of an ultraviolet-curing type resin formed by curing a raw material for the elastic layer comprising a urethane acrylate oligomer (A), a photo-polymerization initiator (B) and a conductive agent (C) through ultraviolet irradiation, and the urethane acrylate oligomer (A) is a urethane acrylate oligomer synthesized by using as a polyol a polyether polyol (a1) having a proportion of primary hydroxyl groups in hydroxyl groups located at molecular ends of not less than 40% obtained by an addition polymerization of propylene oxide to a polyhydric alcohol alone, or the polyether polyol (a1) and another polyol (a2).

2. A conductive elastic roller according to claim 1, wherein the polyether polyol (a1) has a molecular weight of 500-5,000, a functionality of 1.5-2.5 and a hydroxyl value of 20-230 mg KOH/g.

3. A conductive elastic roller according to claim 1, wherein a mass ratio (a1/a2) of the polyether polyol (a1) to the other polyol (a2) is within a range of 100/0-30/70.

4. A conductive elastic roller according to claim 1, wherein the raw material for the elastic layer further contains an acrylate monomer (H).

5. A conductive elastic roller according to claim 4, wherein the acrylate monomer (H) is at least one selected from the group consisting of isomyristyl acrylate and β-acryloyloxyethyl hydrogen succinate.

6. A conductive elastic roller according to claim 1, wherein the ultraviolet-curing type resin has an Asker C hardness of 40-60 degrees.

7. A conductive elastic roller according to claim 1, which is a developing roller or a charging roller.

8. An image forming apparatus using a conductive elastic roller as claimed in claim 1.

* * * * *